United States Patent

[11] 3,581,159

| [72] | Inventors | John Piper<br>Greenville, S.C.;<br>Carl F. Leitten, Jr., Indianapolis, Ind. |
|------|-----------|---|
| [21] | Appl. No. | 875,790 |
| [22] | Filed | Nov. 12, 1969 |
| [45] | Patented | May 25, 1971 |
| [73] | Assignee | Union Carbide Corporation<br>New York, N.Y. |

[54] SOLID ELECTROLYTE CAPACITOR HAVING IMPROVED COUNTERELECTRODE SYSTEM
24 Claims, 11 Drawing Figs.

[52] U.S. Cl. ................................................. 317/230, 29/570
[51] Int. Cl. ................................................. H01g 9/05
[50] Field of Search ......................................... 317/230, 231, 232, 233; 29/570

[56] References Cited
UNITED STATES PATENTS

| 3,142,886 | 8/1964 | Bronson et al. | 317/230X |
| 3,189,797 | 6/1965 | Okamato et al. | 317/230 |
| 3,296,505 | 1/1967 | Sparrow et al. | 317/230 |
| 3,337,429 | 8/1967 | Zind | 317/230 |

*Primary Examiner*—James D. Kallam
*Attorneys*—Paul A. Rose, Thomas I. O'Brien and Leo A. Plum, Jr.

ABSTRACT: A solid electrolytic capacitor and method for the production thereof comprising a body of an anodizable metal, an oxide layer produced by anodization of the body as a dielectric, a solid semiconductive electrolyte layer over the oxide, and an electrically conductive counterelectrode system consisting of a layer of carbon particles on the solid electrolyte, a thin-walled copper lamellar coating over the carbon layer, and an electrical connection to the copper lamellar coating.

PATENTED MAY 25 1971

INVENTORS
JOHN PIPER
CARL F. LEITTEN, JR.

BY Leo A. Plum, Jr.
ATTORNEY

CAPACITOR HAVING COPPER LAMELLAR COATING

CAPACITOR WITH CONVENTIONAL SILVER PAINT COATING SOLDERED TO SUBSTRATE SHOWN AFTER EXPOSURE TO 225° C FOR 5 MINUTES

CAPACITOR HAVING COPPER LAMELLAR COATING OF
THIS INVENTION SOLDERED TO SUBSTRATE AND SHOWN
AFTER EXPOSURE TO 250°C FOR 10 MINUTES

CONDITON OF CONVENTIONAL SILVER PAINTED CAPACITORS
AND COPPER COATED CAPACITORS OF THIS INVENTION
AFTER EXPOSURE TO MOLTEN SOLDER AT 300°C FOR
INDICATED PERIODS OF TIME

COPPER    SILVER

15 SEC.

30 SEC.

*Fig. 11*

INVENTORS
JOHN PIPER
CARL F. LEITTEN, JR.
BY Leo A. Plumip.
ATTORNEY

SOLID ELECTROLYTE CAPACITOR HAVING IMPROVED COUNTERELECTRODE SYSTEM

This invention relates to electrical capacitors and to a process for producing the same.

More specifically this invention relates to electrolytic capacitors of the type having a body of a film forming or anodizable metal as one of the capacitor electrodes, an oxide layer produced by anodization of the body as a dielectric, and a counterelectrode system consisting of a solid semiconductive layer over the oxide as a solid or dry electrolyte, and an electrically conductive cathode layer over the solid electrolyte.

In U.S. Pat. No. 3,166,693 a particular type of solid electrolytic capacitor is disclosed as having an anode comprising a porous body of compressed particles of a film forming metal, for example tantalum. Such capacitors are manufactured by compressing tantalum powder into a porous body and then sintering the body to form the porous anode. The porous body may include a short tantalum wire as an anode lead. The porous anode is then suspended in a bath of liquid electrolyte containing an inert electrode and a current is passed from the porous anode through the liquid electrolyte and to the inert electrode, thereby forming a thin dielectric film consisting of tantalum oxide over the entire surface of the porous tantalum body, including the internal surfaces of the pores. The filmed anode is removed from the bath, washed and then impregnated with semiconductive material, for example, by immersion in a manganous nitrate solution which is pyrolytically convertible to a solid semiconductive manganese dioxide layer in intimate contact with the anode film. Following a series of such impregnation steps, the anode is again subjected to anodization in a liquid electrolyte to heal any faults in the dielectric oxide film. The so-treated anode is then further impregnated with manganese dioxide in another series of immersion and heating cycles to substantially fill the pores of the anode with manganese dioxide and to provide an outer coating of manganese dioxide on the anode exterior. A final anodization of the impregnated anode is generally performed and then the counterelectrode is applied over the manganese dioxide.

In order to provide a low resistance contact to the manganese dioxide coating, a layer of carbon particles is first generally formed in the pores and over the outer surface of the anode by immersing the unit in a colloidal suspension of graphite followed by air-drying of the unit to drive off the liquids. The resulting soft, porous carbon coating serves to lower the equivalent series resistance of the tantalum anode by reducing the electrical resistance at the manganese dioxide metal interface. Since carbon is not solderable, it is conventional to next apply a coating of silver paint over the carbon layer and then to apply solder over the silver coating to complete the counterelectrode system of the capacitor. Or, the silver-coated anode could be directly soldered into an encapsulating container or circuit structure.

The silver paint coating intermediate the carbon coating and the solder outer layer on the capacitor has good electrical properties but is very sensitive to elevated temperatures. However despite its limitations, the use of this silver paint coating has been the accepted commercial practice because of the inability to supply a substitute. While there have been references in the prior art to the production of such intermediate metallic coatings as by spraying, electrodeposition, evaporating or melting on a suitable metal, including such metals as copper, zinc, silver, gold and others, until the present time, there has not been available a satisfactory substitute for the silver paint coating.

The silver paint coating is formed by applying a silver-containing material, for example a liquid organic compound, such as a resin containing fine silver particles, over the graphite coating and then heating the assembly to about 100° C. for about one-half hour to cure the silver-organic mixture and form a conductive, silver-containing outer layer on the anode. The so-formed capacitors may then be processed in a number of ways depending on their intended end use. For example, the outer silver-coated surface of the unit may be solder coated, and a cathode lead wire then soldered thereto. Such units may then be encapsulated in metal or nonmetal containers or in molded or dipped plastic materials. Alternatively, the silver paint-coated capacitor, with or without a further solder coating, may be placed in a cup-shaped can containing an amount of molten solder at its closed end to seal the capacitor in the can. A cathode lead wire is then connected to the can while the tantalum lead wire extends from the anode out the open end of the can from which it may be insulated by a glasslike hermetic seal. Unencapsulated capacitors may be mounted directly on a substrate, for example, on a printed circuit board, by placing a solder-coated capacitor on a conductive land on the substrate and then soldering it thereto, as by a reflow soldering process. Provision is also made to connect the anode lead wire to another land on the substrate.

In all, there are a number of techniques for encapsulating solid electrolytic capacitors or using the unencapsulated capacitors directly in electrical circuits. Generally most of these techniques require that a solder coating be applied to the silver paint coating on the capacitor in order to connect cathode lead wires or other cathode terminations. It has been found that the silver paint coating is attacked by the solder used in completing these cathode terminations. The attack takes the form of a scavenging of the outer silver paint layer by dissolution of the silver particles from the silver-organic paint into the solder. The rate of dissolution of the silver into the solder is a function of the maximum temperature to which the silver paint coating-solder system is exposed during application of the solder coating, during assembly of the solder-coated capacitor onto substrates or with other components, as well as during use of the completed capacitor at elevated temperatures. The results of this dissolution of silver into the solder is the formation of nonconductive voids and discontinuities in the silver-organic paint layer causing a degradation of the electrical capabilities of the capacitor, for example, a significant increase in the equivalent series resistance. This problem detracts from the reliability and ruggedness of solid electrolytic capacitors and places severe restrictions on the temperatures at which the devices may be fabricated and on the environments in which they may be used.

Is is the object of this invention therefore to provide solid electrolytic capacitors of increased ruggedness and reliability.

It is a specific object of this invention to provide an improved solid electrolytic capacitor having increased resistance to elevated temperatures.

It is another object of this invention to provide improved solid electrolytic capacitors which are particularly suitable for use in applications requiring the use of high temperature soldering, or other high temperature metal joining operations, as a step in the incorporation of the device into a circuit structure.

It is also an object of this invention to provide solid electrolytic capacitors having improved counterelectrode systems of increased resistance to elevated temperatures and of increased compatibility with high temperature solder alloys.

It is also the object of this invention to provide a process for fabricating solid electrolytic capacitors having the improved counterelectrode system described herein.

Other aims and advantages of this invention will be apparent from the following description, the appended claims and the attached drawings.

Figure 10:
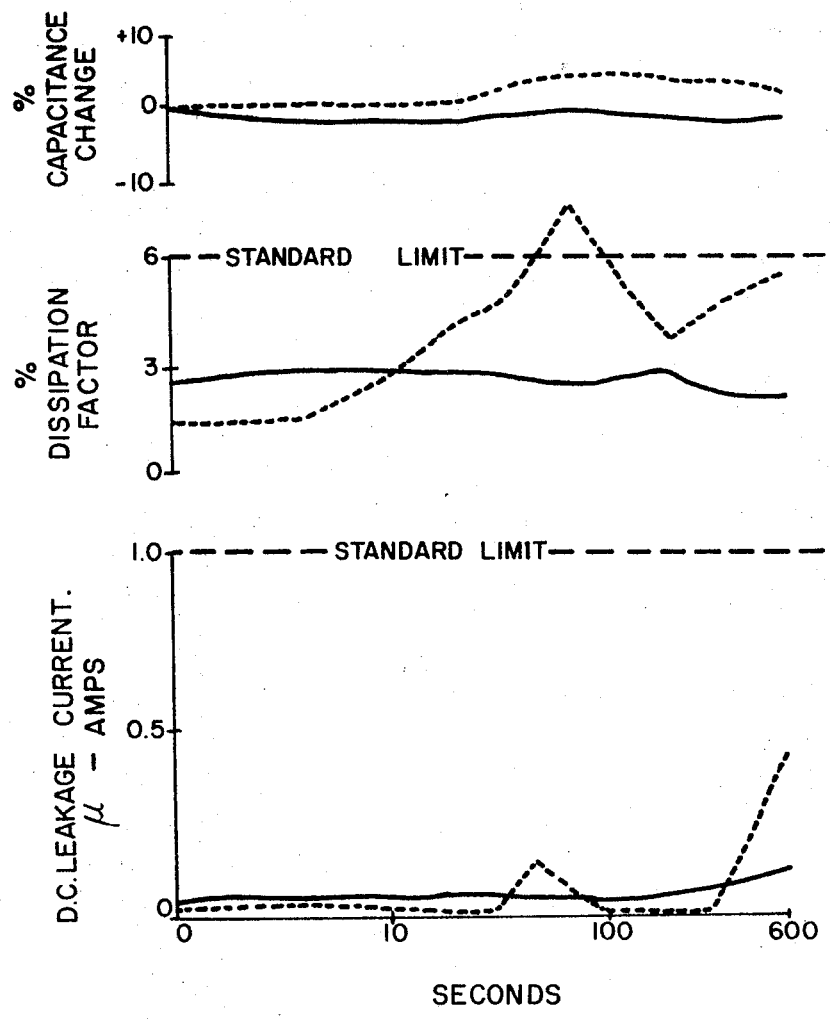

FIG. 10 is a graphical representation of the average change in capacitance, dissipation factor, and DC leadage current of a number of capacitors having a conventional silver paint outer coating of the prior art and also the average change in capacitance of a number of the improved capacitors of this invention having a copper lamellar coating. The capacitance values shown were measured after both groups of capacitors were exposed to molten solder at 300° C. for periods of time up to 10 minutes;

FIG. 11 is a photomicrograph, at about normal size, showing sample capacitors having a conventional silver paint outer coating, designated "silver" and capacitors having the copper lamellar coating of this invention, designated "copper." The capacitors are shown after having been subjected to the tests referred to in FIG. 10, i.e., exposure to molten solder at 300° C., for (1) a period of 15 seconds and (2) a period totaling 30 seconds exposure.

In accordance with the objects an improved solid electrolytic capacitor is provided consisting of an anode, a dielectric oxide coating on the surface of said anode, a solid semiconductive electrolyte layer on said dielectric oxide, and a cathode layer in electrical contact with the semiconductive electrolyte layer, said cathode layer consisting of a thin-walled lamellar structure of microscopic leaflike particles of substantially oxide-free copper, disposed in overlapping and interlocking relationship to form said outer cathode layer. Generally a layer of graphite overlies said semiconductive electrolyte layer so that the copper leaflike particles are bonded to each other and to the underlying graphite layer. The thin-walled copper lamellar structure can completely replace the conventional silver paint coating, or the copper lamellar layer can be deposited over a previously applied silver paint coating, in which case the thin-walled copper lamellar structure serves as a diffusion barrier between the silver coating and the solder.

The capacitor anode may be a solid body of an anodizable metal, for example tantalum, in the form of wire, strip, plate or any other suitable structure. The capacitor anode may also be a porous body formed of sintered particles of the anodizable metal, in which case an anode lead wire, preferably of the same metal, may extend from the porous anode body in nonelectrical contacting relationship with the solid semiconductive electrolyte and overlying graphite and copper lamellar structure.

A solder coating can be applied over the copper lamellar layer to enable the further treatment of the device in any of the following ways: connection of a cathode contact or lead wire, strip, etc. to the cathode layer by soldering; encapsulation of the capacitor in a solder-filled enclosure; direct incorporation of the capacitor onto a substrate by soldering of the cathode layer on the capacitor to a metallic contact on the substrate, as by reflow soldering; connection of any other structure or component to the capacitor by soldering of such element to the cathode layer on the capacitor. It is not essential that the copper lamellar cathode layer be first solder coated before performing any of these soldering connections, but it is generally preferred. It is also possible to make electrical contact to the copper lamellar cathode layer of the capacitor by other metal joining techniques including clamping, welding, brazing, etc.

Solid electrolyte capacitors of the porous tantalum anode type having the copper lamellar cathode layer described herein can be produced by the process consisting of providing a sintered porous anode body composed of an anodizable metal, for example tantalum, forming a thin dielectric film consisting of tantalum oxide over the surfaces of the anode body, applying a coating of solid semiconductive electrolyte over the dielectric oxide film, preferably applying a layer of graphite particles over the semiconductive electrolyte coating and thereafter applying the thin lamellar structure of microscopic leaflike particles of substantially oxide-free copper by introducing a stream of finely divided copper particles into a heated stream of nonoxidizing gas to at least partially fuse said copper particles and then directing said stream of at least partially fused copper particles through a nonoxidizing environment onto the surface of the graphite-covered solid electrolyte coating whereby the soft, nonoxidized copper particles impinge on said surface and deform and become bonded to each other and to the underlying graphite-covered surface in a lamellar layer. The stream of heated gases which acts as the medium for at least partially melting and carrying the finely divided copper particles may be a jet plasma effluent. The copper particle carrying stream of heated inert gas may be maintained in a nonoxidizing environment while being directed at the anode by performing the process in a chamber containing only oxygen-free gases or by providing a protective shroud of nonoxidizing gas around the copper particle carrying stream.

The thin-walled, lamellar structure of substantially oxide-free microscopic leaflike copper particles making up the outer metallic cathode layer of the capacitors of this invention yields a number of substantial advantages in terms of the performance of the resulting devices. Whereas a silver paint coating on conventional anodes is attacked by the solder used in completing the cathode termination to the capacitors, the copper lamellar cathode coating of this invention is not so attacked due to the relatively low solubility of copper in solder. The use of the copper lamellar coating in place of, or in addition to, the silver coating alleviates the problem of degradation of the capacitor's electrical properties which is normally experienced with conventional silver paint cathode coatings. In addition to improving the reliability and ruggedness of the capacitors, the resistance of the copper lamellar cathode coating to attack by solder even at elevated temperatures permits the use of high temperature techniques when assembling the capacitor into an enclosure or into a circuit structure and furthermore permits the use of the capacitors in applications exposed to elevated temperatures.

Figure 1:
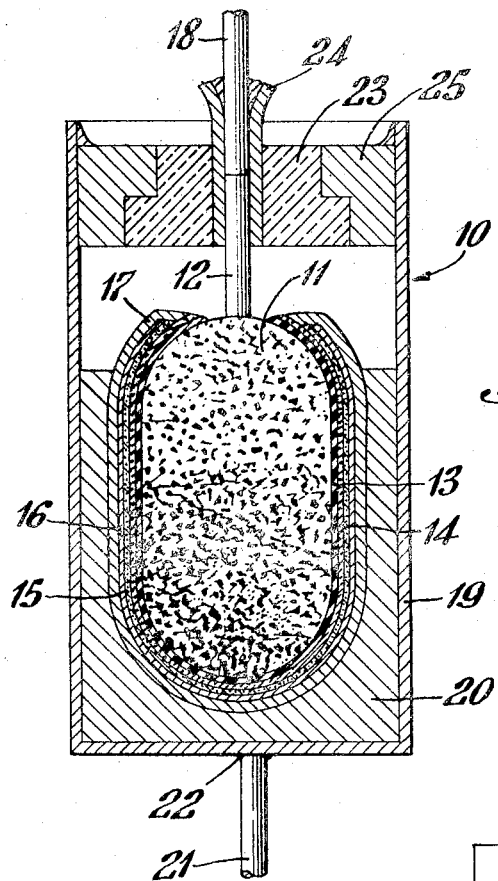
FIG. 1 is a vertical sectional view of an encapsulated solid electrolytic capacitor according to the present invention.

Referring to the drawings, FIG. 1 shows an encapsulated solid electrolytic capacitor 10. Such capacitors are prepared by compacting and then sintering a powdered metal, preferably tantalum, into a porous pellet 11 which is generally cylindrical in shape, and which has a solid tantalum lead wire 12 embedded therein. The pellet 11 serves as the anode and the wire 12 as the anode lead wire. While tantalum is the preferred metal, other metals which are capable of forming an insulating oxide film thereon are also suitable, including: aluminum, tungsten, columbium, hafnium, titanium and zirconium.

The sintered pellet 11 is thereafter anodized by well-known techniques, for example in an acid bath to form the oxide film 13 over the interior and the exterior surfaces of the anode 11. This oxide film 13, which in the case of a tantalum anode is tantalum pentoxide ($Ta_2O_5$), acts as the dielectric of the capacitor. Since the anode 11 is porous the dielectric film 13 permeates the innermost interstices of the anode pellet, covering all the exposed surface area of the pellet with the oxide film. After anodization is complete, the pellet is then provided with a film of a solid semiconductor electrolyte 14, preferably manganese dioxide ($MnO_2$).

The film of manganese dioxide is generally formed in situ by impregnation of the oxide-covered tantalum anode pellet with aqueous manganous nitrate ($Ma(NO_2)_2$) solution which is then pyrolyzed to form solid manganese dioxide. This method consists of dipping the anodized pellet is not a solution of the manganous nitrate, and after removing the pellet from the solution, thereupon placing it in an oven for heating at a temperature in the range of 200° C. to 400° C. for a time sufficient to convert the manganous nitrate solution to solid manganese dioxide. This process of dipping the anode in manganese nitrate solution followed by pyrolysis in an oven is repeated a number of times to build up a sufficient thickness of manganese dioxide and to ensure that the pores of the anode pellet contain the solid electrolyte.

Following several such dipping and heating cycles, the anode is generally anodized again. This second anodization serves to reform the tantalum pentoxide film on the anode pellet. Following this reforming anodization, the cycle of dipping in manganous nitrate solution followed by pyrolysis is repeated for as many times as is necessary to complete the manganese dioxide coating 14. Thereafter a final anodization of the manganese dioxide coated and impregnated pellet is performed to heal any defects in the anode oxide film. The preceding process represents a conventional technique for forming the solid electrolyte of such capacitors. It is not essential to the practice of this invention that all of the listed steps be performed or that they be performed in the exact order given. Additionally steps other than those listed may be performed on the anode to form any particular type of solid electrolyte desired. It is only necessary for the practice of this invention that a solid electrolyte coating be formed, preferably manganese dioxide but not so limited.

The counterelectrode system of the capacitor is then completed by coating the anode first with a layer of colloidal graphite 15 in order to make good electrical contact to the layer of manganese dioxide, as by immersing the unit in "Aquadag," an aqueous suspension of graphite, followed by air-drying or heating to drive off the water. A metallic coating 16 is then applied over the graphite layer. As explained previously, in the conventional process for making such capacitors, this metallic layer comprises a silver-organic paint coating, e.g., a suspension of silver particles in a resin matrix. The anode is dipped into the silver paint, or the paint sprayed thereon, and then it is cured to leave a coating containing silver particles scattered throughout the solid resin. According to the process of this invention, however, the silver-organic coating is replaced by a coating consisting of substantially oxide-free copper particles in leaflike form disposed in overlapping and interlocking relationship to form the thin-walled lamellar outer metallic cathode layer 16 of the capacitor. A layer of solder 17 is then applied over the thin-walled copper lamellar coating 16 to complete the unit. A metal lead wire or an encapsulating container can be connected to the outer solder layer 17. The use of the copper lamellar coating 16 of this invention between the graphite impregnated manganese dioxide layer 14 and the outer solder coating 17 results in a number of advantages over the conventional silver-resin paint. With the conventional silver layer, it has been found that the silver, being soluble in solder, is scavenged from the outer silver-organic paint unless extreme caution is taken during the soldering process. The rate at which the scavenging occurs is proportional to the temperature of the solder and the duration of time to which the silver layer is exposed to the hot solder. These factors make the use of a high temperature solder extremely difficult and also place limitations upon the time at which even a lower temperature solder can be used in the molten state in contact with the conventional silver coating. In addition, because of the inability to use high temperature solders, there is a limitation on the use of conventional capacitors in applications involving exposure to high temperatures or in manufacturing techniques wherein capacitors are joined to circuit structures using high temperature reflow soldering or other high temperature processes.

The use of the copper lamellar coating of this invention has the advantage that the copper coating has a lower rate of solubility into solder and therefore allows the use of high temperature solders in the manufacture of the devices. For example, high temperature solders such as those which are solid at temperatures over 200° C. and up to 300° C. can be used in contact with the copper lamellar coated capacitors of this invention. Examples of such high temperature solders are: a 96 percent tin—4 percent silver solder having a melting point of about 220° C.; a 99.25 percent tin—0.75 percent copper solder having a melting point of about 220° C.; an 80 percent gold—20 percent tin eutectic having a melting point of about 290° C. With conventional silver-organic paint coated capacitors, it is generally necessary to use lower temperature solders, such as the 60 percent tin—40 percent lead type solders having melting points of about 180° C. ± 5° or 10°. The capacitors of this invention having a copper lamellar coating can also be used with the lower temperature solders, such as the 60 percent tin—40 percent lead type, with the additional advantage that the capacitor itself can be at a temperature of 200° or 230° C. when soldered whereby the soldering operation will be more effective.

Additionally the capacitors having the copper lamellar coating of this invention can be exposed to molten solder for longer intervals of time and can also be subjected to reflow soldering techniques whereby the capacitor is incorporated into circuit structures along with other components. One such reflow soldering process, for example, requires the exposure of the device to a temperature of about 225° C. for 5 minutes, which is beyond the capabilities of conventional silver-organic paint coated capacitors but well within the capabilities of the capacitors of this invention.

The completed capacitors and structures can also be used in higher temperature applications since the higher temperature solders can be used with the more heat-resistant copper lamellar coating provided on the capacitor. For example, the capacitors of this invention can withstand continuous exposure to temperatures of 200° C. In addition to maintaining their electrical properties at such temperatures, the thin-walled copper lamellar coating provides greater ruggedness and reliability than the previously used silver-organic paint coatings under such high temperature conditions.

The improved counterelectrode system of this invention provides advantages in regard to whatever form of encapsulation or end use to which the capacitor is subjected. In the embodiment shown in FIG. 1 the capacitor has been encapsulated in a sealed container. This is accomplished as follows: if not already provided, an additional length 18 of anode lead wire, preferably of a solderable metal such as nickel, is welded to the short tantalum lead wire 12 extending from the anode pellet. The capacitor is then inserted into a suitable container 19, for example, a solder-coated brass can which is open at one end and which contains molten solder at its base. The pellet 11 is securely attached to the inside of the container 19 by the solder 20, which can be a high temperature solder, and which makes good electrical contact with both the anode pellet and the walls of the container 19. A cathode lead wire 21 is welded at a point 22 to the closed end of the container 19. The capacitor may be then sealed hermetically, if desired, by a metal rimmed glass insulating member 23 which is provided with a hole containing a metal eyelet 24 through which is passed the anode lead wire 18 of the capacitor. The lead wire is soldered to the metal eyelet and the metal rim 25 of the insulator member 23 is soldered around its periphery in the open end of the capacitor. As will be demonstrated hereinafter, the improved copper cathode has greater ruggedness, reliability and resistance to elevated temperatures whereby the soldering operations performed in canning the capacitor can be carried out with higher temperature solders and/or under more stringent conditions than were possible with the previously used silver-organic paint cathode coatings. Additionally the completed capacitor can be exposed to higher temperature conditions of use because of the increased resistance of the copper lamellar cathode coating. Furthermore since higher temperature solders can now be used with capacitors provided with the copper lamellar cathode coating of this invention, the capacitors are more suited for applications requiring such exposure to high temperatures as high as 200 C. and above.

Figure 2:
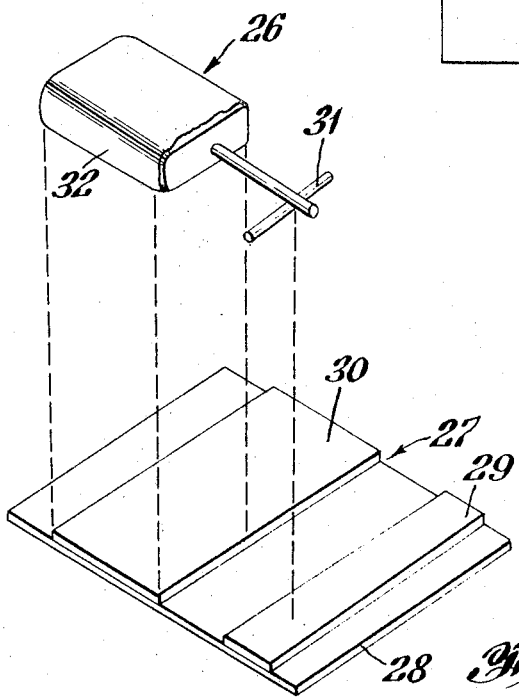
FIG. 2 is a perspective view of an unencapsulated capacitor according to the present invention shown prior to assembly on a substrate.

The solid electrolytic capacitor can also be employed in other forms than as individually encapsulated units. For example, the capacitor may be adapted for mounting directly on a substrate alone or in combination with other electrical components in a so-called hybrid circuit. FIG. 2 shows a solid electrolytic capacitor 26 of the type described herein adapted to be mounted on a portion only of such a substrate 27, it being understood that the substrate may extend in one or more other directions in the same plane to provide a base for the mounting of additional components as desired. Or if desired, the substrate 27 with a single capacitor 26 thereon can be used as a single unit whereby outside electrical connections can be made to the substrate lands rather than to the capacitor itself.

The substrate comprises a hard base 28 of the insulating material, for example a circuit board, having formed thereon conductive lands 29 and 30 such as copper strips laminated onto the circuit board. The lands 29 and 30 are spaced apart a proper distance to enable the contacting of nickel anode lead wire 31 of the capacitor 27 to the land 29 and contacting of the solder-coated cathode portion 32 to the land 30. The capacitor 26 has the copper lamellar coating previously described under the solder layer 32.

In the reflow soldering process for joining the capacitor 26 to the substrate 27, the lands 29 an 30 are solder coated as is the outer layer 32 of the capacitor and the nickel lead wire 31, which is in the form of a crossbar welded to the tantalum lead of the anode pellet. After the capacitor is properly positioned over the appropriate lands on the substrate, the unit is subjected to heat to cause the solder to reflow and make the connections. The temperature and duration of heating is generally greater than that which conventional silver painted capacitors could withstand, for example a temperature of 225° C. for 5 minutes. However by use of the copper lamellar coating of this invention, the capacitor can be processed by the reflow soldering technique without danger of damage. In addition, since other components in a hybrid circuit structure may have higher temperature capabilities than a conventional silver paint-coated capacitor, the use of the more heat resistant copper lamellar coating on capacitors used in such circuits allows the use of the completed circuit structure at a higher intended temperature range without need to compensate for the normally temperature sensitive solid electrolytic capacitor components. Solid electrolytic capacitors with their high volumetric efficiency can thus be used more freely in hybrid circuit applications.

Figure 3:
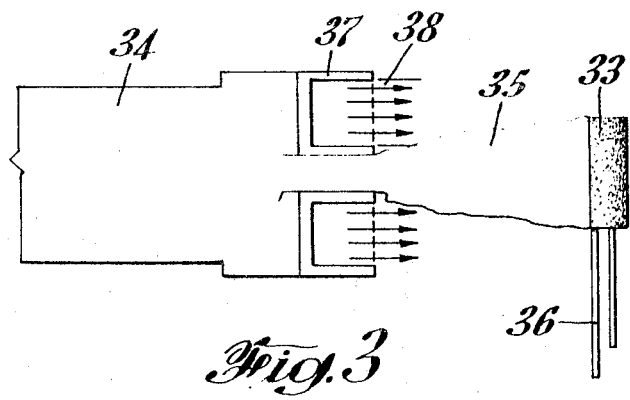
FIG. 3 is a schematic diagram, not necessarily to scale, illustrating an arrangement for forming a copper lamellar coating on a capacitor according to this invention.

The thin-walled copper lamellar structure of this invention is applied to the capacitor anode by directing a stream of at least partially fused, substantially oxide-free copper particles through a nonoxidizing environment onto the surface of the graphite-covered solid electrolyte coating of the anode whereby the soft, nonoxidized copper particles impinge on the surface and deform and become bonded to each other and to the underlying graphite-covered surface in a lamellar layer. FIG. 3 shows one embodiment of a system for carrying out this process, wherein a solid electrolytic capacitor 33 has been processed to the point of having a graphite outer coating. A nontransferred plasma arc torch 34 of the type shown in U.S. Pat. No. 3,016,447 is positioned so that its effluent 35 is directed at the capacitor 33. The lead wire portion of the capacitor may be shielded from the arc effluent by an appropriate shielding device 36.

In the arch torch 34, an electric arc is established between a tungsten electrode and a second electrode therein and an appropriate inert gas, such as argon, is passed in contact with the tungsten electrode to contain the arc. The effluent emerging from the torch comprises a high-pressure arc and high thermal content argon effluent. High purity copper powder is introduced into the argon stream inside the torch and is at least partially melted in the torch effluent. The effluent 35 thus comprises a stream of finely divided, nonoxidized copper articles in a stream of nonoxidizing gas. Shielding gas, such as argon, is introduced into the coaxial jet shielding nozzle 37 to provide a nonoxidizing environment or shroud 38 around the stream of copper particles. A system which has been suitable for performing the above process is set out in the U.S. Pat. No. 3,470,347, issued Sept. 30, 1969, filed Jan. 6, 1968 and entitled "Method For Shielding A Gas Effluent."

The copper particles fed into the plasma arc torch jet should be finely divided so that they will have a high surface-to-volume ratio and be effectively heated in the hot stream of effluent gases so as to be at least partially molten before impinging on the anode body. Generally the copper particles will be fully melted into the form of spheres of molten copper. It is generally sufficient however if the copper particles are only at least partially fused into the form of soft plastic bodies so that they will deform into leaflike form when impacted on the anode. Additionally the copper powder should be finely divided so that the momentum of the particles, which travel at a very high velocity in the arc torch effluent, will only be sufficient to cause the generally spherical molten particles to flatten on impact on the anode body to form the leaflike structure and become bonded to each other and to the underlying graphite coating in a lamellar structure. The use of larger size particles having high momentum could result in damage to the graphite layer and underlying fragile manganese dioxide layer. Copper powder passing a 325 mesh, i.e. below about 44 microns and having an average particle size of about 20 microns has been found to be suitable. The use of finely divided copper powder also allows the formation of a high density adherent coating which will have a sufficient depth of copper particles to form the cohering lamellar structure well adhered to the underlying graphite layer but which will be essentially thin-walled whereby expansion effects due to thermal stresses will not cause the copper lamellar coating to separate from or damage to underlying coatings. Using the size copper powder specified above, thin-walled structures of from 0.0002 inches to 0.003 inches can be formed. A coating thickness of about 0.001 inches is suitable for most soldering operations.

The copper particles supplied to the plasma jet should be substantially oxide free since the presence of the oxide films prevents the attainment of a copper coating having the desired mechanical nd electrical properties. The presence of excessive amounts of oxide in the copper powder causes the copper particles to be hard and undeforming, requiring the use of high momentum effluent streams which tend to damage the fragile graphite and manganese dioxide coatings on the anode. Additionally oxide-containing copper coatings have poor electrical conductivity characteristics, raising the equivalent series resistance of the capacitor to unacceptable levels. Such oxide-containing copper coatings also have poor solderability because of the inability of molten solder to wet oxide-covered copper, necessitating the use of fluxes which contaminate the capacitor.

According to the present inventions a high purity copper powder is heated in a nonoxidizing environment of gases and the stream is protected in a nonoxidizing environment until impact of the copper particles on the anode. Whereas finely divided copper particles of the size used therein would rapidly oxidize if heated in an uprotected gas stream, the process of this invention ensures that the copper coating formed on the anode will be substantially nonoxidized, thereby yielding good electrical properties. Additionally, due to the high temperature of the plasma jet effluent of the arc torch, which may heat the copper powder to several hundred degrees above its melting point, it has been found that any oxide initially present in the copper powder is actually driven off to yield an even purer copper coating. Thus in one example performed using the inert gas shield-arc torch delivery system described above, the copper powder having an initial content of 0.126 percent oxygen was deposited as a coating having only 0.092 percent oxygen, which is sufficiently low to yield good electrical characteristics whereas an unshielded plasma jet effluent carrying the same copper powder deposited a coating having a higher oxygen content of 0.302 percent. The use of hydrogen in the arc torch effluent will further serve to reduce the oxide content of the copper. Thus it is not necessary to use exceptionally pure copper powder and copper powders which are only substantially oxide free are quite suitable.

As shown in FIG. 3, the arc torch 34 is positioned at a standoff distance from the anode 33 such that the copper particle containing effluent 35 strikes the anode surface. The standoff distance should not be so short as to subject the anode to the extremely hot plasma arc as it leaves the torch 34. The anodes can be arranged in a row and made to move past the shield 36 to be exposed to the effluent 35 for only a short interval of time sufficient to deposit the thin-wall copper coating on that side of the anode facing the torch. The anodes can then be passed before the torch with the opposite side facing the effluent. It is not generally necessary to completely cover the full surface of the anode with a copper coating in the form of a continuous copper sleeve. Since the lamellar structure is composed of microscopic leaflike particles which cohere well to each other and which readily adhere by keying into the underlying structure, the copper coating will be secure even if there are slight patches of uncoated anode surface remaining after processing. In the case where a silver paint is used under he copper lamellar coating, then it is not necessary to completely coat the silver surface with copper but only to coat a sufficient area to provide a low resistance bond with the silver surface.

Since the finely divided copper particles are easily melted, an arc torch of relatively low power capacity may be used. For example an arc torch having a tungsten electrode surrounded by a nozzle having an orifice diameter of approximately three-eighths inch was used as a coating device. Argon gas was introduced into the torch as the torch gas and carrier for the copper powder in a total amount of about 300 cfh. The arc current was 70 amperes at 56 volts. The torch standoff was about one-half—three-fourths inch. Copper powder having an oxygen analysis of about 0.1 weight percent was introduced into the torch at the rate of 67 grams per minute. A coaxial jet shielding device 38 was attached to the torch and the coaxial gas stream surrounding the arc effluent had a width of about 1 inch. Argon gas was introduced into the shielding device at a rate of 1500 cfh. The anodes were traversed past the shield 36 at a rate of about 1000 per minute and then reversed and passed again to coat the opposite side. The copper lamellar coating so produced had the excellent properties described herein.

As previously stated, other apparatus than that shown can be used to produce the copper coatings of this invention. For example any heated stream of inert gas sufficient to at least partially melt the copper particles may be employed and maintained in a nonoxidizing environment by any form of inert gas shroud or protective atmosphere.

The advantages of the copper lamellar cathode coating of this invention are due to the composition and structure of this coating as compared to cathode coatings of the prior art, including previously applied copper cathode coatings. For example, the prior art mentions that cathode coatings of copper and other metals can be applied by techniques such as spraying from a Schoop metallizing spray gun. In that process successive portions of copper wire are melted in a flame and atomized by a blast of compressed air. The resulting spray consists of a high velocity stream of relatively large copper globules which are highly oxidized in the blast and in transit to the capacitor anode. These large copper bodies impinge upon graphite and the manganese dioxide electrolyte coatings on the anode with considerable impact and can penetrate the fragile manganese dioxide coating and underlying thin dielectric film, causing a short circuit to the tantalum anode. The built-up coating of large copper particles is of low density, yielding a thick-walled, uneven and coarse structure consisting of a network of interconnected pores having entrained copper oxide. The capacitor structure is often so enlarged as to not fit in the capacitor cans. This nonhomogenous structure is due to the large size of the sprayed particles and the fact that the oxide coating thereon interferes with the fusion of the particles to each other and to the underlying graphite-coated electrolyte surface. Because of the high porosity of the coating, the buildup of copper must be carried on to a relatively great thickness to insure that a more or less impervious copper sheath is formed; and because of the highly oxidized internal and surface state of the so-formed coating, the electrical conductivity is poor.

Another technique for applying copper coatings, which would be unsuited for the purpose of this invention, would involve the use of unshielded flame spraying methods. According to such processes a stream of copper particles, while finer than those delivered by a Schoop spray, would be directed through a combustible flame or unprotected arc effluent and would be highly oxidized in transit and would produce a coating having low electrical conductivity and poor solderability because of the entrained oxide. Because of the shortcomings of such previously available copper coatings, the use of the apparently highly desirable copper coating on capacitors instead of the temperature sensitive silver-organic paint coatings has been delayed until the present time. Additionally, it has been thought in the past that copper coatings would be oxidized on the anode because of the underlying manganese dioxide, which is in contact with the metallic outer layer through the porous graphite coating. It has been found however that the copper lamellar structure deposited as described herein is not so oxidized by the underlying manganese dioxide and in fact retains its high purity and excellent conductivity. Table 1 below sets forth the comparative properties of the copper coatings as would be produced by the various methods described herein: (1) by a Schoop spraying operation; (2) by an unprotected flame spraying operation; and (3) by the process of this invention using an inert gas shield-arc torch effluent under the conditions described herein:

TABLE I.—COMPARISON OF PROPERTIES OF COPPER COATINGS AS WOULD BE PRODUCED BY VARIOUS METHODS

| Property | Process used | | |
|---|---|---|---|
| | Schoop wire gun spray | Unprotected flame spraying | Inert-gas shielded flame or arc spraying of this invention |
| Adherence to carbon coating | Poor | Poor | Good, lamellar structure adheres to itself and keys into underlying structure. |
| Particle size and condition | Large, oxidized | Small, oxidized | Small, leaf-like; substantially unoxidized. |
| Solderability | Fair (interconnected pores and surface oxidized, flux needed) | Poor (high oxygen content) | Good (interconnected pores, if any, and surface unoxidized). |
| Density | Less than 80% because of large particles and entrained oxide | Less than 80% | 80% and over giving thin-walled coating. |
| Electrical conductivity | Poor | Poor | Good (as high as with silver-organic paints but having higher resistance to elevated temperatures). |

As shown in table 1, the copper lamellar coating of this invention has a conductivity as good as that obtained with the currently used silver paints and at the same time provides a metallic outer coating for the capacitor which is more highly solderable and more resistant to elevated temperatures.

Figure 4:
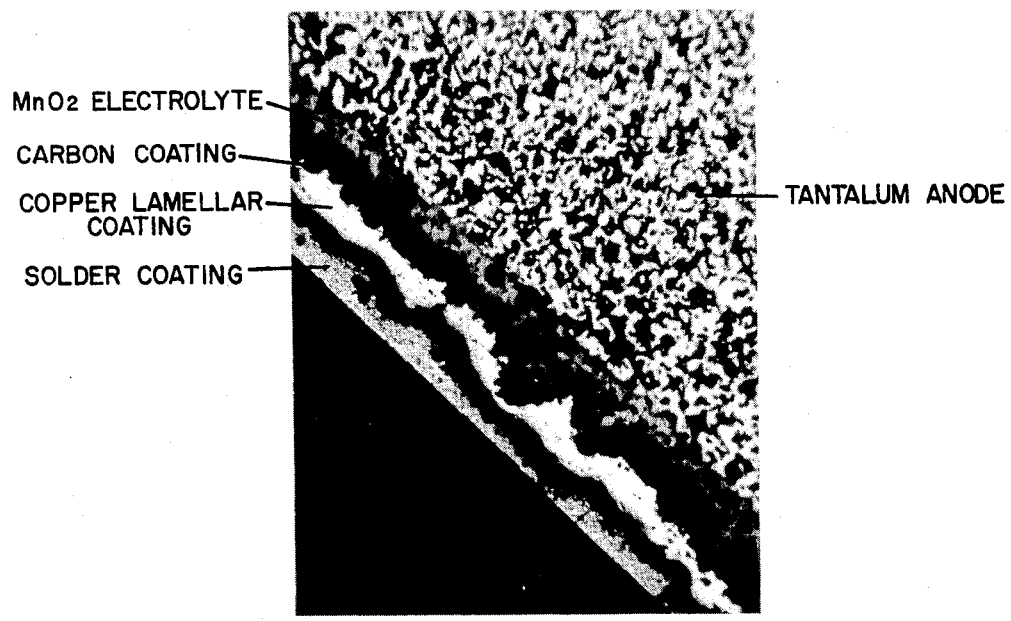
FIG. 4 is photomicrograph, at approximately 80 diameters magnification, showing a cross section of a solid electrolytic capacitor having the copper lamellar cathode coating of this invention and after having been solder coated.

FIG. 4 illustrates a cross section of a solid electrolytic tantalum capacitor made in the conventional manner, but having the copper lamellar coating of this invention completely replacing the previously used silver-organic paint coating. A high temperature solder has been applied to the copper lamellar coating. The excellent adhesion and uniformity of the copper-solder interface is apparent. By use of the high temperature solder, made possible because of the provision of the copper coating, such capacitors are capable of undergoing assembly temperatures up to 300° C. and can be operated continuously at temperatures of 200° C.

Figure 5:
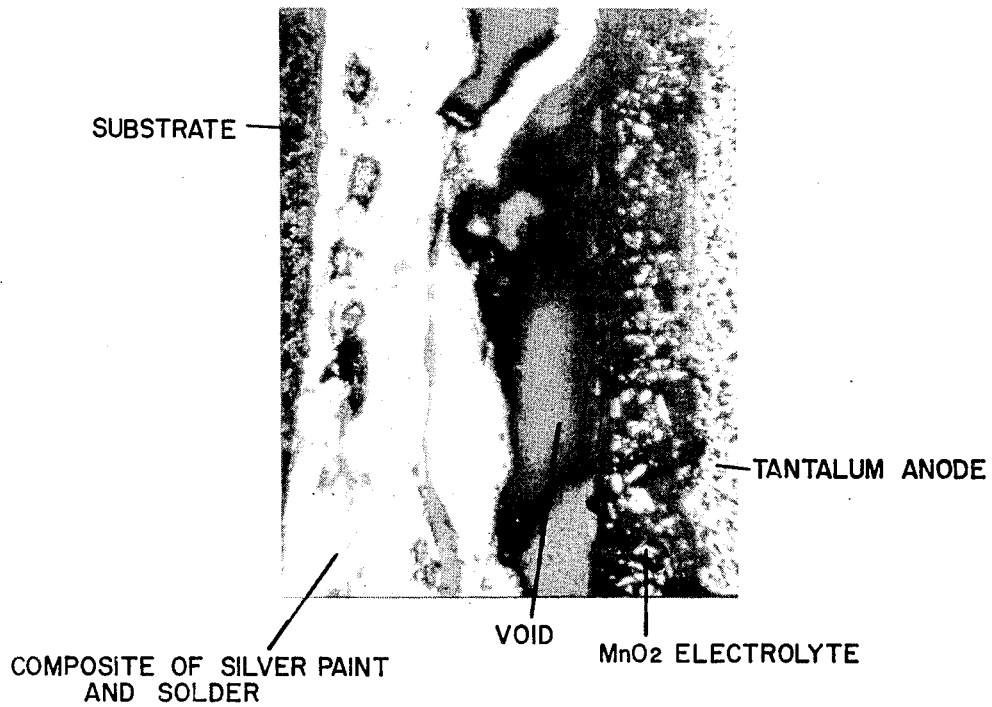
FIG. 5 is a photomicrograph, at approximately 80 diameters magnification, showing a cross section of a solid electrolyte capacitor provided with a conventional silver paint outer cathode coating and then solder coated and mounted on a substrate, the structure shown having been exposed to a temperature of 225° C. for 5 minutes.

FIG. 5 shows effects of exposure to high temperatures on conventionally made capacitors having silver paint systems. The capacitor was of the type shown in FIG. 2 and had been soldered to a ceramic substrate and subsequently exposed to a temperature of 225° C. for 5 minutes. Due to degradation of the organic binder at such high temperatures, the silver paint layer has been decomposed and delaminated, leaving voids and a mechanically weak, and electrically high-resistant contact between the solder layer and the manganese dioxide layer. This causes a severe degradation in the electrical properties of the capacitor, mainly a high equivalent series resistance and thus high dissipation factor.

Figure 6:
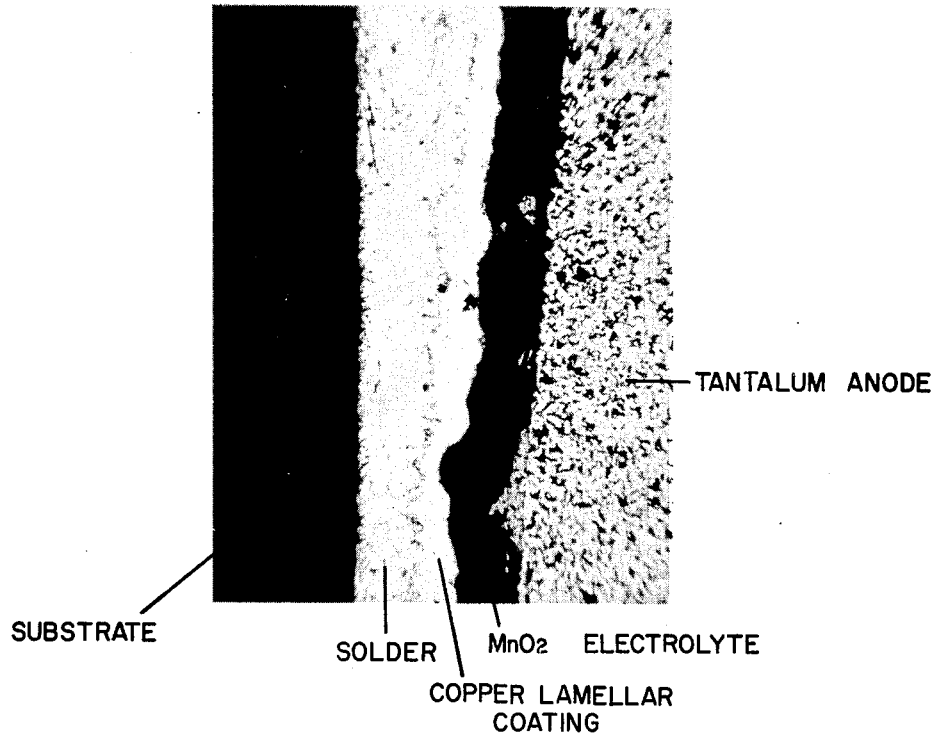
FIG. 6 is a photomicrograph similar to that of FIG. 5 but of a solid electrolytic capacitor having the copper lamellar cathode coating of this invention, the structure shown having been exposed to a temperature of 250° C. for 10 minutes.

FIG. 6, on the other hand, represents a capacitor of the same type as shown in FIG. 5 but in which the silver-organic paint coating has been replaced by the copper lamellar coating of this invention, and soldered to a ceramic substrate. After exposure to a temperature of 250° C. for 10 minutes, it can be seen that there is no degradation of the copper coating. The electrical properties remained excellent.

Figure 7:
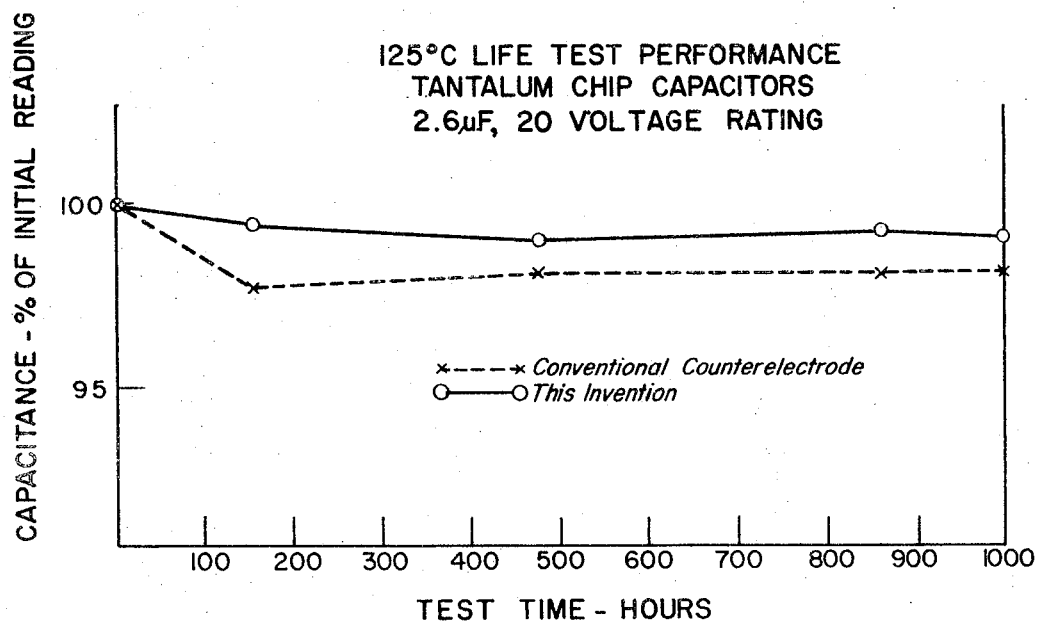
FIG. 7 is a graphical representation of the change in capacitance of a capacitor having a conventional silver paint outer coating of the prior art and an improved capacitor of this invention, as determined in a life test performance study at an elevated temperature.
Figure 8:
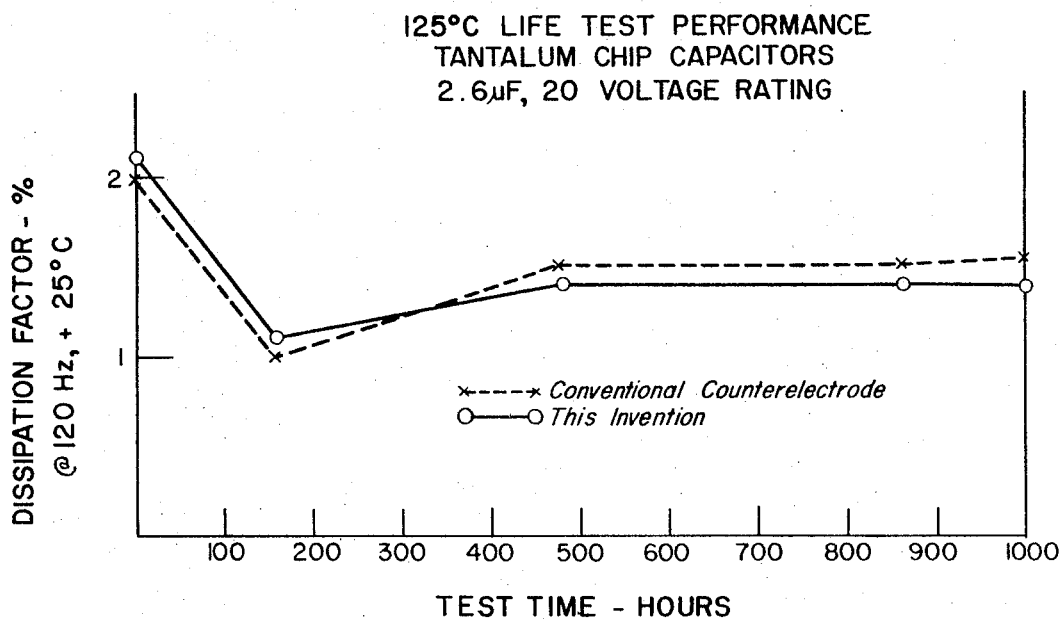
FIG. 8 is a graphical representation of the results of the life test performance study referred to in FIG. 7, but now showing the change in dissipation factor of the conventional capacitor and the improved capacitor of this invention.
Figure 9:
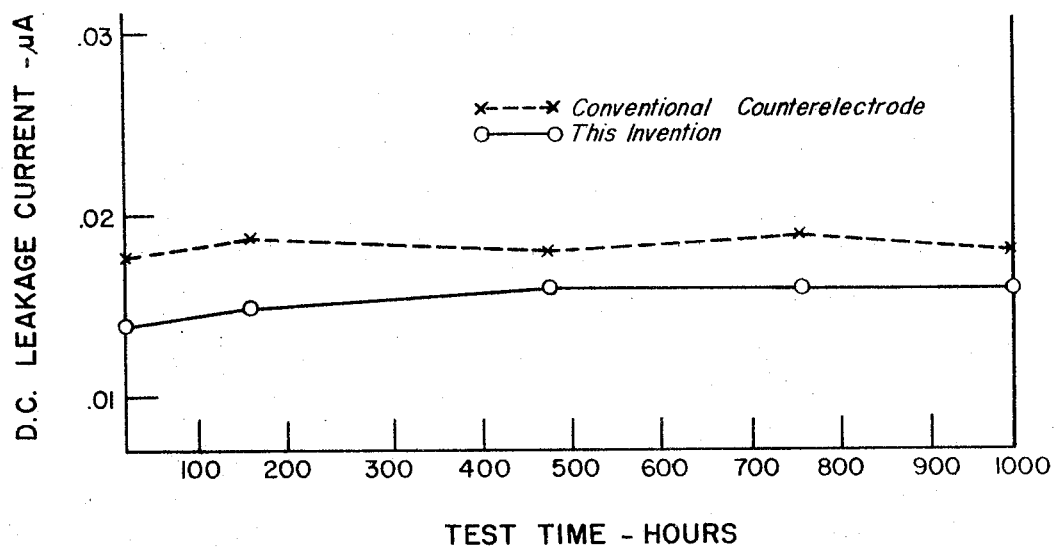
FIG. 9 is a graphical representation similar to those in preceding FIGS. 7 and 8, but now showing the change in DC leakage.

FIGS. 7, 8 and 9 show the performance characteristics of both conventional solid electrolytic capacitors having silver paint coatings and the improved capacitors of this invention having the copper lamellar coating. As shown both type capacitors are subjected to 1000 hour 125° C. full rated voltage life tests. The capacitance, dissipation factor and DC leakage characteristics of the conventional capacitors are typical of such capacitors, while the characteristics of the capacitor of this invention are significantly improved.

FIGS. 10 and 11 relate to high temperature tests performed on sample lots of capacitors having (1) conventional silver paint coatings and (2) the copper lamellar coating of this invention. The tests involved immersion of the cathode portion of the capacitors in molten solder maintained at a temperature of 300° C. to simulate extreme conditions which might occur during the assembling of capacitors, mounting in circuits, malfunction of adjacent components in the circuit, or unusual operating conditions. The period of exposure was for successive periods up to 10 minutes, with tests performed on each capacitor after 15 seconds of exposure, then another 15 seconds of exposure to give a total of 30 seconds exposure, and so on up to 10 minutes of total exposure.

In the tests of lot of nine unencapsulated units (6.8 uf, 10-volt capacitors) having the copper lamellar coating were each tested at 25° C. after the indicated periods of exposure to the molten solder at 300° C. The average capacitance, dissipation factor and logarithmic means leakage current were determined and are plotted in FIG. 10 as the solid lines. The final electrical parameters of all nine of these capacitors were all within the commonly used limits of acceptance for such devices.

A similar experiment was conducted on 10 unencapsulated units (12 uf, 10-volt capacitors) having a conventional silver paint coating. Severe degradation of the silver paint and lack of wetting by the solder to the capacitor was found to occur after only 5 seconds exposure to the molten solder at 300° C. This lack of solder coating and degradation of the silver paint made measurements difficult. The electrical measurements were made by actually probing to the carbon and electrolyte layers. The results, where obtained, are presented as the dashed lines in FIG. 10. Of the 10 silver paint-coated capacitors which started the test, only three survived the high temperature and probing necessary to make contact to the unwetted anode. On two of these it was possible to obtain a dissipation factor below the commonly accepted limit, but only by probing. It should be understood therefore that useful devices could not be made from these conventional silver paint-coated capacitors after only a few seconds exposure to 300° C. temperatures whereas the capacitors with a copper lamellar coating were in all ways satisfactory after 10 full minutes of exposure to 300° C.

FIG. 11 shows the extent of the degradation of the conventional silver paint-coated anodes (designated "silver") referred to above after the indicated periods of exposure to the 300° C. temperature. The capacitors having the copper lamellar coating (designated "copper") are shown alongside and are seen to have a solder coating which is intact and adherent and provided the good electrical properties plotted in FIG. 10.

We claim:

1. A solid electrolytic capacitor comprising an anodizable metal anode and an anodized dielectric oxide layer thereon, a solid semiconductive electrolyte layer covering the dielectric oxide, and an electrically conductive counterelectrode system, over the semiconductive electrode layer, comprising a layer of carbon particles over the solid electrolyte, and a layer, over the carbon particles, of a thin-walled lamellar structure of microscopic leaflike particles of substantially oxide-free copper, disposed in overlapping relationship and interlocking with the underlying coatings.

2. A solid electrolytic capacitor comprising a porous anode body formed of sintered tantalum particles, an anodized dielectric oxide film formed on the exposed surfaces of said particles, a solid electrolyte layer of manganese dioxide covering the surface of the dielectric oxide film in the pores and on the surface of the anode body, a layer of carbon particles covering the manganese dioxide electrolyte, and a layer, over the carbon particles, of a thin-walled lamellar structure of microscopic leaflike particles of substantially oxide-free copper, disposed in overlapping relationship and interlocking with the underlying coatings.

3. The solid electrolytic capacitor of claim 2 in which a layer of cured silver-organic paint overlies the layer of carbon particles and underlies the copper lamellar coating.

4. The solid electrolytic capacitor of claim 2 in which the wall thickness of the copper lamellar structure is from about 0.0002 to 0.003 inches.

5. An unencapsulated solid electrolytic capacitor comprising a porous anode body of sintered tantalum particles, an anode lead extending therefrom having a first tantalum portion joined to the anode body and a second portion comprising a solderable metal joined to the tantalum portion, an anodized dielectric oxide film formed on the exposed surfaces of the particles forming the anode body and over at least part of the surface of the tantalum portion of the anode lead, a solid electrolyte layer of manganese dioxide covering the surface of the dielectric oxide film in the pores and on the surfaces of the anode body, a layer of carbon particles covering the manganese dioxide electrolyte, and a layer, over the carbon particles, of a thin-walled lamellar structure of microscopic leaflike particles of substantially oxide-free copper disposed in overlapping relationship and interlocking with the underlying coatings.

6. The solid electrolytic capacitor of claim 5 in which a layer of solder has been applied to the copper lamellar layer, said solder having a melting point between 200° C. and 300° C.

7. The solid electrolytic capacitor of claim 5 in which the wall thickness of the copper lamellar structure is about 0.001 inches.

8. The capacitor of claim 5 in which the second portion of the anode lead is a nickel member welded to the first portion in a transverse position.

9. The article of claim 8 which is joined to a substrate consisting of an insulating member having one conductive portion soldered to the copper lamellar coated portion of the capacitor, and a second conductive portion on said member soldered to the nickel portion of the anode lead.

10. A solid electrolytic capacitor capable of use at a temperature of 200° C. comprising a porous anode body formed of sintered tantalum particles, a tantalum anode lead wire joined at one end to the anode body, a nickel lead wire extension welded to the other end of the tantalum lead wire, an anodized dielectric oxide film formed on the exposed surfaces of the tantalum particles forming the anode body and over at least part of the surface the tantalum lead wire, a solid manganese dioxide electrolyte covering the surface of the dielectric oxide film in the pores and on the surfaces of the anode body, a layer of carbon particles covering the manganese dioxide electrolyte, a layer, over the carbon particles, of a thin-walled lamellar structure of microscopic leaflike particles of substantially oxide-free copper disposed in overlapping relationship and interlocking with the underlying coatings, a layer of fused solder at least partially covering the copper lamellar layer, said solder having a melting point between 200° C. and 300° C.

11. The article of claim 10 which is enclosed in an open-mouthed metallic container by a solder connection to the copper lamellar coated anode, and wherein the nickel lead wire is insulated from the container and extends through a hermetic seal closing the container mouth.

12. A method for producing a solid electrolytic capacitor comprising the steps of providing an anodizable metal anode having a continuous anodized dielectric oxide film on the surface thereof, forming a solid semiconductive electrolyte coating over the dielectric oxide film, forming a layer of carbon particles over the electrolyte coating, and thereafter directing a stream of at least partially fused, finely divided particles of substantially oxide-free copper through a nonoxidizing environment onto the surface of the carbon layer with the copper particles forming a lamellar coating and, together with the carbon layer, a counterelectrode over the solid electrolyte coating.

13. A method for producing a solid electrolytic capacitor comprising the steps of forming a porous anode body of sintered tantalum particles having a continuous oxide film on the exposed surfaces of said particles, impregnating the porous body with a solution of a manganese salt convertible upon heating to manganese dioxide and heating the impregnated anode to convert the solution material to a manganese dioxide coating, applying a layer of carbon particles over the manganese dioxide coating, and passing substantially oxide-free, finely divided copper particles through a heated stream of nonoxidizing gas to at least partially fuse said particles and protect them from oxidation, and directing said stream of nonoxidizing gas and at least partially fused, finely divided particles of substantially oxide-free copper onto the surface of the carbon layer with the copper particles forming a copper lamellar coating and, together with the carbon layer, a counterelectrode over the solid electrolyte coating.

14. The method of claim 13 in which the layer of carbon particles if formed by applying an aqueous suspension of colloidal graphite over the manganese dioxide coating and drying said suspension to leave a layer of graphite particles.

15. The method of claim 13 in which molten solder is applied over the copper lamellar coating to form a solder coating thereon.

16. The method of claim 15 in which the solder is applied at a temperature in excess of 200° C.

17. The method of claim 13 in which the stream of copper particles is introduced into a heated stream of a nonoxidizing gas to at least partially fuse the copper particles and the heated stream containing the copper particles is then directed through a shroud of nonoxidizing gas onto the surface of the carbon layer.

18. The method of claim 17 in which the heated stream of nonoxidizing gas is the effluent of a nontransferred plasma arc torch.

19. The method of claim 17 in which the arc gas is argon.

20. The method of claim 17 in which the arc gas contains hydrogen.

21. The method of claim 13 in which the copper particles are of a size passing a 325 mesh.

22. The method of claim 13 in which the average size of the copper particles is about 20 microns.

23. The method of claim 13 in which the nonoxidizing gas is argon.

24. The method of claim 13 in which the copper lamellar coating is formed to a wall thickness of about 0.001 inches.